(12) United States Patent
Besso (10) Patent No.: US 10,470,488 B2
(45) Date of Patent: Nov. 12, 2019

(54) SMOKING ARTICLE COMPRISING A FLAVOUR DELIVERY MATERIAL

(75) Inventor: Clement Besso, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 1141 days.

(21) Appl. No.: 14/240,068

(22) PCT Filed: Aug. 30, 2012

(86) PCT No.: PCT/EP2012/066926
§ 371 (c)(1),
(2), (4) Date: Apr. 9, 2014

(87) PCT Pub. No.: WO2013/034488
PCT Pub. Date: Mar. 14, 2013

(65) Prior Publication Data
US 2015/0034099 A1 Feb. 5, 2015

(30) Foreign Application Priority Data

Sep. 9, 2011 (EP) .................................... 11250776

(51) Int. Cl.
*A23L 27/00* (2016.01)
*A24B 15/28* (2006.01)
(Continued)

(52) U.S. Cl.
CPC .............. *A24B 15/32* (2013.01); *A23L 27/72* (2016.08); *A24B 15/283* (2013.01); *A24B 15/34* (2013.01);
(Continued)

(58) Field of Classification Search
None
See application file for complete search history.

(56) References Cited

U.S. PATENT DOCUMENTS 4,715,390 A 12/1987 Nichols
5,186,185 A 2/1993 Mashiko
(Continued)

FOREIGN PATENT DOCUMENTS

CN 101983018 A 3/2013
CN 101925403 A 12/2013
(Continued)

OTHER PUBLICATIONS

Zambiazi, et al. "Fatty Acid Composition of Vegetable Oils and Fats", CEPPA (Curitiba PR, Brasil), v. 25, n. 1, p. 111-120, Jan.-Jun. 2007, accessed on Apr. 13, 2018 via: http://gamalift.com.br/site/artigos/30.pdf.*
(Continued)

*Primary Examiner* — Michael J Felton
(74) *Attorney, Agent, or Firm* — Mueting, Raasch & Gebhardt, P.A.

(57) ABSTRACT

A smoking article includes an aerosol-generating substrate comprising a flavor delivery material for thermally releasing a flavorant. The flavor delivery material comprises a polymer matrix and a plurality of domains of a flavor composition dispersed within the polymer matrix. The flavor composition comprises a flavorant mixed with one or more triglycerides including at least 30% by weight of triglyceride having at least one carboxylic acid having a chain length of greater than 12. The flavorant is releasable from the polymer matrix upon heating the flavor delivery material to elevated temperatures.

17 Claims, 2 Drawing Sheets

(51) Int. Cl.
*A24B 15/32* (2006.01)
*A24B 15/34* (2006.01)
*A24F 47/00* (2006.01)

(52) U.S. Cl.
CPC ........ *A24F 47/002* (2013.01); *A23V 2002/00* (2013.01)

(56) References Cited

U.S. PATENT DOCUMENTS

| | | |
|---|---|---|
| 5,221,502 A | 6/1993 | Washington |
| 5,778,899 A | 7/1998 | Saito |
| 6,325,859 B1 | 12/2001 | De Roos |
| 6,436,461 B1 | 8/2002 | Bouwmeesters |
| 6,929,814 B2 | 8/2005 | Bouwmeesters |
| 8,057,784 B2 | 11/2011 | Witteveen |
| 8,470,215 B2 | 6/2013 | Zhang |
| 2003/0082272 A1 | 5/2003 | Bouwmeesters |
| 2006/0144412 A1 | 7/2006 | Mishra |
| 2007/0274930 A1 | 11/2007 | Witteveen |
| 2009/0038629 A1 | 2/2009 | Ergle |
| 2009/0102418 A1 | 4/2009 | Gaber |
| 2009/0142286 A1 | 6/2009 | Blin |
| 2009/0227670 A1 | 9/2009 | Berg |
| 2009/0317521 A1 | 12/2009 | Campanile |
| 2010/0104689 A1 | 4/2010 | Thorengaard |
| 2010/0175982 A1 | 7/2010 | Perez Celada |
| 2010/0242976 A1 | 9/2010 | Katayama |
| 2011/0061666 A1 | 3/2011 | Dube |
| 2011/0236557 A1 | 9/2011 | Suzuki |
| 2013/0276803 A1 | 10/2013 | Saito |

FOREIGN PATENT DOCUMENTS

| | | |
|---|---|---|
| CN | 101883833 A | 2/2014 |
| EP | 1 252 831 A2 | 10/2002 |
| EP | 1252830 | 10/2002 |
| JP | 2001-507926 | 6/2001 |
| JP | 2007-525994 | 9/2007 |
| JP | 2007/525994 | 9/2007 |
| JP | 2010-143952 | 7/2010 |
| KR | 96-700639 | 2/1996 |
| KR | 2009-0110733 | 10/2009 |
| WO | WO 95/020330 | 8/1995 |
| WO | WO 99/24159 | 5/1999 |
| WO | WO 00/008958 | 2/2000 |
| WO | WO 2008/037578 | 4/2008 |
| WO | WO 2008/143507 | 11/2008 |
| WO | WO 2009/022232 | 2/2009 |
| WO | WO 2010/015713 | 2/2010 |
| WO | WO 2011/116975 | 9/2011 |

OTHER PUBLICATIONS

PCT International Search Report and Written Opinion dated Mar. 8, 2013 for PCT/EP2012/066926 (12 pages).
PCT International Preliminary Examination Report dated Nov. 7, 2013 for PCT/EP2012/066926 (7 pages).
Office Action issued in China for Application No. 201280043506.X dated Oct. 16, 2015, 24 pages. English translation included.
European Search Report derived from EP Application No. 11250776.9 dated Mar. 15, 2012 (6 pages).
Office Action issued in Japan for Application No. 2014-528933 dated Nov. 14, 2016 (6 pages). English translation included.
Office Action issued in Japan for Application No. 2014-507926 dated Apr. 28, 2016 (7 pages). English translation included.
Notice of Allowance issued in Korea for Application No. 10-2014-7004229 dated Jun. 27, 2019 (3 pages). English translation included.

* cited by examiner

SMOKING ARTICLE COMPRISING A FLAVOUR DELIVERY MATERIAL

This application is a U.S. National Stage Application of International Application No. PCT/EP2012/066926, filed Aug. 30, 2012, which was published in English Mar. 13, 2013 International Patent Publication WO 2013/034488 A2. International Application No. PCT/EP2012/066926 claims priority to European Application No. 11250776.9 filed Sep. 9, 2011.

The present invention relates to a smoking article including a flavour delivery material that releases a flavourant when heated.

It is well known to incorporate flavourant additives into smoking articles in order to provide additional flavours to the consumer during smoking. Flavourants may be used to enhance the tobacco flavours produced upon heating or combusting the tobacco material within the smoking article, or to provide additional non-tobacco flavours such as mint or menthol.

The flavourant additives used in smoking articles, such as menthol, are commonly in the form of a liquid flavourant which is incorporated into the filter or the tobacco rod of the smoking article using a suitable liquid carrier. Liquid flavourants are often volatile and will therefore tend to migrate or evaporate from the smoking article during storage. The amount of flavourant available to flavour the mainstream smoke during smoking is therefore reduced.

It has previously been proposed to reduce the loss of volatile flavourants from smoking articles during storage through the encapsulation of the flavourant, for example, in the form of a capsule or microcapsule. The encapsulated flavourant can be released prior to or during smoking of the smoking article by breaking open the encapsulating structure, for example by crushing or melting the structure.

It would be desirable to provide a novel material and mechanism for the delivery of flavour which shows improved stability and improved retention of flavourants during storage. It would be particularly desirable to provide a smoking article having a flavour delivery material that releases flavour when heated or combusted. It would further be desirable to provide a smoking article having a flavour delivery material for a smoking article that can release flavour in a controlled way during smoking.

According to the invention there is provided a smoking article comprising an aerosol-generating substrate. The aerosol-generating substrate comprises a flavour delivery material for thermally releasing a flavourant, the flavour delivery material comprising: a polymer matrix; and a plurality of domains of a flavour composition dispersed within the polymer matrix. The flavour composition comprises a flavourant and one or more triglycerides, which includes at least 30% by weight of triglycerides having at least one carboxylic acid with a chain length greater than 12.

The flavour delivery material of the present invention includes a structural matrix of a polymer material that forms a network defining a plurality of domains. The term "domain" is used throughout the present specification to refer to the pores or pockets that contain the flavour composition or the distinct regions or droplets of the flavour composition that are dispersed within the polymer matrix. The flavour composition is dispersed through the polymer matrix in a plurality of discrete domains which are surrounded and enclosed by the polymer matrix.

The polymer matrix of the flavour delivery material of the present invention traps the flavour composition within the domains so that the flavourant is substantially retained within the structure of the polymer matrix until the flavour delivery material is exposed to elevated temperatures, for example above 220° C. The matrix structure therefore advantageously minimises the loss of the flavourant from the flavour delivery material during storage of the material. This is particularly advantageous where the flavourant contains a volatile material that may otherwise vaporize during storage.

The flavour delivery material of the present invention shows improved stability compared to the flavour delivery materials of the prior art. As discussed in more detail below, the improved stability is demonstrated using a thermogravimetric analysis of the flavour delivery material. As a result of the improved stability, the flavour delivery material can be stored for long periods without significant loss of the flavourant. Furthermore, the improved retention of the flavourant within the flavour delivery material according to the invention means that it is no longer necessary to add extra flavourant to compensate for the loss of flavourant during storage. In some cases, this enables a smaller amount of flavourant to be used, whilst still providing similar delivery of flavour.

As well as showing improved storage stability, the flavour delivery material of the invention also advantageously shows improved stability upon heating up to relatively high temperatures. It is thought that this is due to the stability of the matrix and domain structure of the flavour delivery material. In particular, as explained in more detail below, in some embodiments most of the flavourant in the flavour composition domains will be stably retained within the polymer matrix until the material is heated to a temperature above 220° C. For most flavourants and flavour delivery materials, this temperature is well above the temperature at which the flavourant would otherwise volatilise.

The flavour composition of the flavour delivery material of the present invention includes a flavourant mixed with one or more triglycerides including at least about 30% by weight, preferably at least about 50% by weight, more preferably at least about 75% by weight, and most preferably about 100% by weight triglycerides having one or more carboxylic acids with a chain length greater than 12. Alternatively, the one or more triglycerides includes at least about 30% by weight, preferably at least about 50% by weight, more preferably at least about 75% by weight, and most preferably about 100% by weight triglycerides having all three carboxylic acid chain lengths greater than 12.

In other embodiments, the one or more triglycerides includes at least about 30% by weight, preferably at least about 50% by weight, more preferably at least about 75% by weight, and most preferably about 100% by weight triglycerides having one or more carboxylic acid with a chain length greater than 15. Alternatively, the one or more triglycerides includes at least about 30% by weight, preferably at least about 50% by weight, more preferably at least about 75% by weight, and most preferably about 100% by weight triglycerides having all three carboxylic acid chain lengths greater than 15.

In yet other embodiments, the one or more triglycerides includes at least about 30% by weight, preferably at least about 50% by weight, more preferably at least about 75% by weight, and most preferably about 100% by weight triglycerides having one or more carboxylic acids with a chain length greater than 17. Alternatively, the one or more triglycerides includes at least about 30% by weight, preferably at least about 50% by weight, more preferably at least about 75% by weight, and most preferably about 100% by weight triglycerides having all three carboxylic acid chain lengths greater than 17.

A triglyceride is an ester derived from glycerol and three fatty acids, or carboxylic acids. The "chain length" of a carboxylic acid chain in a triglyceride refers to the number of carbon atoms in the backbone of the carboxylic acid. For example, a carboxylic acid chain length of 16 is formed from glycerol and a fatty acid having 16 carbon atoms in the backbone of the aliphatic tail of the fatty acid. Triglycerides having one or more carboxylic acid chain lengths greater than 12 are typically referred to as long chain triglycerides.

The one or more triglycerides may be provided as individual components, or may be provided in a material including one or more triglycerides in combination with other components. The component of the flavour composition including the one or more triglycerides acts as a carrier for the flavourant and can be referred to as a "triglyceride excipient". The flavourant is blended with the triglyceride excipient to form the flavour composition. In certain embodiments, the flavourant is dispersed or dissolved in the triglyceride excipient.

The use of a flavour composition including a triglyceride excipient comprising a significant proportion of long chain triglycerides has surprisingly been found to provide an improved distribution of the domains of the flavour composition within the polymer matrix compared to the prior art materials using alternative excipients. In particular, the domains of the flavour composition in the flavour delivery material of the present invention have been found to be more uniformly distributed through the polymer matrix. The domains have also been found to have a relatively uniform size distribution. Without wishing to be bound by theory, it is believed that this improvement in the dispersion of the flavour composition domains within the polymer matrix is at least partly responsible for the improved stability shown by the flavour delivery material.

The carboxylic acid chains may be saturated such that all bonds between the carbon atoms in the chain are single bonds, or at least partially unsaturated such that the chain includes at least one double or triple bond between two carbon atoms in the chain. Preferably, there are more saturated chains in the triglyceride compounds than unsaturated chains. In some cases, the ratio of saturated to unsaturated chains is at least about 1.6, more preferably at least about 1.8 and most preferably at least about 2.0. The greater relative amount of saturated chains can make the product more stable over time, in some cases increasing the potential shelf life of the product.

The flavour composition may include a combination of two or more long chain triglycerides having different chain lengths to each other. For example, the flavour composition may comprise an oil or fat including a mixture of long chain triglycerides, optionally in combination with other short chain or medium chain triglycerides in which all of the carboxylic acid chains have a length of 12 or less. The oil or fat including the triglycerides may be of vegetable origin, animal origin, or artificially produced.

In a particularly preferred embodiment of the present invention, the flavour composition comprises cocoa butter as the triglyceride excipient. Cocoa butter is a vegetable fat extracted from cocoa beans, which includes a combination of triglycerides derived mostly from palmitic acid (chain length 16), oleic acid (chain length 18) and stearic acid (chain length 18).

The use of cocoa butter in the flavour composition of the present invention has been found to result in particularly stable flavour delivery materials according to the invention. Cocoa butter is a stable lipid compound that can be combined with a flavourant to provide a stable flavour composition that retains the flavourant effectively. The migration of the flavourant out of the flavour delivery material during storage is therefore minimised. For the purposes of the present invention, cocoa butter can be defined, prepared, handled and analysed according to Codex Standard 86-1981, Rev. 1-2001. Suitable cocoa butters for use in the present invention are available from a number of suppliers. One example is Astra "A" press cocoa butter from ADM Cocoa B.V.

As mentioned above, preferred triglycerides may have certain carboxylic acid chain lengths. In other cases, alternative preferred triglycerides may have shorter chain lengths than those mentioned above, but otherwise have similar properties, for example similar crystalline properties or other physical properties such as melting points. Such alternative preferred triglycerides may have a functional group along the carboxylic acid chain that causes the triglyceride to have properties similar to long chain triglycerides.

For example, in certain preferred embodiments of the present invention the flavour composition comprises a polymorphic fat as the triglyceride excipient. A "polymorphic" fat is a fat that solidifies in a plurality of different crystal structures, with different melting points and crystallisation temperatures, which in some embodiments may enhance the stability of the flavour composition and the flavour delivery material. A preferred example of a polymorphic vegetable fat is cocoa butter.

Preferably, the triglyceride excipient comprises at least one fat, wherein the slip point melting point of the fat, as measured by the slip point method described in the example below, is at least about 22° C., more preferably at least about 25° C., and most preferably at least about 27° C. Preferably, the triglyceride excipient comprises at least one fat having a slip point melting point between about 22° C. and about 45° C., more preferably between about 25° C. and about 40° C., most preferably between about 27° C. and about 35° C.

In other embodiments, the triglyceride excipient comprises at least one fat, wherein the clear point melting point of the fat, as measured by the clear point method described in the example below, is at least about 22° C., more preferably at least 25° C., and most preferably at least 27° C. Preferably, the triglyceride excipient comprises at least one fat having a clear point melting point between about 22° C. and about 45° C., more preferably between about 25° C. and about 40° C., most preferably between about 27° C. and about 35° C. The use of fats having a melting point above 22° C. has advantageously been shown to provide particularly stable flavour delivery materials.

Preferably, the flavour composition comprises an excipient including at least one of the fats described herein and a flavourant including a material, such as an essential oil, that has a melting point within 15° C. of the melting point of the fat, more preferably within 10° C. This similarity in the melting points of the components of the flavour composition is thought to advantageously result in an amorphous and stable mixture of the flavourant and excipient.

Preferably, the viscosity of the triglyceride excipient is above about 15 mPa·sec (milli-Pascal-seconds) at 60° C., more preferably above about 20 mPa·sec. Alternatively or in addition, the viscosity of the triglyceride excipient is above about 45 mPa·sec at 30° C., more preferably above about 55 mPa·sec. In addition, the viscosity of the triglyceride excipient can be tested over a range of temperatures, for example beginning at 70° C. and then slowly cooling the triglyceride while continuously testing the viscosity. The viscosity of the triglyceride excipient typically rises continuously and at a relatively constant rate as it cools, eventually reaching a point at which crystallization of the fat begins. At this point, the viscosity rises more rapidly and, eventually, the fat solidifies completely. Preferably, the point at which the solidification for the triglyceride excipient begins is about 35° C. or lower, or more preferably about 30° C. or lower. Preferably, the point at which the fat is completely solid is about 25° C. or lower, more preferably about 20° C. or lower. For the purposes of the present invention, the viscosity profile of the triglyceride excipient is measured using the method described in the example below.

The flavourant of the flavour composition includes one or more flavour compounds for providing a desired flavour upon heating of the flavour delivery material. Suitable flavourants for use in the flavour delivery material of the present invention would be well known to the skilled person. The flavourant may be a liquid flavourant or a solid flavourant at room temperature (22° C.). The flavourant may include one or more natural flavourants, one or more synthetic flavourants, or a combination of natural and synthetic flavourants.

A variety of flavours could be used in the flavour delivery material of the present invention. In some embodiments, the flavourant is a high potency flavourant, and is typically used at levels that would result in less than 200 parts per million in the smoke. Examples of such flavourants are key tobacco aroma compounds such as beta-damascenone, 2-ethyl-3,5-dimethylpyrazine, phenylacetaldehyde, guaiacol, and furaneol. Other flavourants can only be sensed by humans at higher concentration levels. These flavourants, which are referred to herein as the low potency flavourants, are typically used at levels that results in orders of magnitude higher amounts of flavourant released into the smoke. Suitable low potency flavourants include, but are not limited to, natural or synthetic menthol, peppermint, spearmint, coffee, tea, spices (such as cinnamon, clove and ginger), cocoa, vanilla, fruit flavours, chocolate, eucalyptus, geranium, eugenol and linalool.

Preferably, the flavourant includes an essential oil, or a mixture of one or more essential oils. An "essential oil" is a volatile oil having the characteristic odour and flavour of the plant from which it is obtained. Suitable essential oils for inclusion in the flavour granules of the present invention include, but are not limited to, peppermint oil and spearmint oil.

In preferred embodiments of the invention, the flavourant comprises menthol. In a particularly preferred embodiment of the invention, the flavour composition comprises menthol dispersed in a cocoa butter excipient. It has been found that the dispersion of menthol in cocoa butter to form the flavour composition provides a particularly stable flavour delivery material for the thermal release of menthol flavours, as demonstrated in the example below.

Preferably, the flavour composition comprises at least about 50% by weight of the flavourant, more preferably at least about 60%, and most preferably at least about 75%. Alternatively or in addition, the flavour composition comprises less than about 90% by weight of the flavourant. For example, one or more of the low potency compounds such as menthol may be added to the flavour composition at any of these levels. The remainder of the flavour composition may comprise at least about 75% by weight, more preferably at least about 90% by weight, and most preferably about 100% by weight of any one or more of the triglycerides described herein. Particularly preferably, the flavour composition comprises between about 50% and about 75% by weight of the flavourant and from about 25% to about 50% by weight of any one or more of the triglycerides described herein. In addition, any of the high potency flavourants mentioned above may be used in conjunction with one or more low potency compounds, for example in an amount between 1 part per million and 375 parts per million.

In some embodiments in which the flavourant consists only of one or more high potency flavourants and it is desired that the flavourant be released at a lower level in the smoke as described above, any of the high potency flavourants mentioned above can be added to the flavour composition at between about 1 part per million to about 375 parts per million. The remainder of the flavour composition may comprise at least about 75% by weight, more preferably at least about 90% by weight, and most preferably about 100% by weight of any one or more of the triglycerides described herein.

Preferably, the domains of the flavour composition within the polymer matrix have an average domain size of about 20 microns or less, more preferably less than about 10 microns and most preferably less than about 5 microns. The domain size is measured by observing all of the domains in a 100 micron by 100 micron cross-sectional sample from near the centre of the flavour delivery material and taking the largest dimension of the cross section of each complete domain in the sample. Preferably, at least about 80% of the domains have a size smaller than any one of the above limits and more preferably about 100% of the domains have a size smaller than any one of the above limits. This is significantly smaller than the typical domain size found for materials having a similar structure but using alternative excipients.

As described above, the flavour delivery materials of the present invention have been found to have an internal structure with a relatively uniform distribution of uniform sized domains defined by closed pores or cells within the polymer matrix. This has been found to reduce the migration of the flavourant to the surfaces of the flavour delivery material and the loss of the flavourant from the material so that the storage stability of the material is improved.

The polymer matrix of the flavour delivery material according to the invention provides a three dimensional network that traps the domains of the flavour composition within it. The polymer matrix is preferably a cross-linked polymer matrix. The cross-linking of the polymer forming the matrix provides structural strength and stability which improves the resistance of the polymer matrix to heat and shear forces. Preferably, the cross-linked polymer matrix is water or moisture resistant. The polymer matrix may be formed from a single type of cross-linkable polymer or a combination of cross-linkable polymers.

Preferably, the polymer matrix comprises one or more polysaccharides. Polysaccharides are particularly suitable for use in the present invention, since they can be made water insoluble and heat stable through cross-linking, and are tasteless. Preferably, the polymer matrix comprises a combination of two or more polysaccharides, wherein the two or more polysaccharides are capable of cross-linking with one another. In some embodiments, the polymer matrix comprises alginate and pectin, wherein the alginate and pectin cross-link with each other. In some embodiments, the polymer matrix comprises at least about 20% by weight pectin. Further, the polymer matrix may have at least about 60% by weight alginate. Preferably, the polymer matrix has between about 20% by weight and about 40% by weight pectin and between about 60% by weight and about 80% by weight alginate. Preferably, the ratio of alginate to pectin is about 2:1, or between about 1.8:1 and about 2.2:1.

The cross-linking of the polymer matrix is preferably achieved through reaction of the polymers with multivalent cations which form salt bridges to cross-link the polymers. The multivalent cations are preferably provided in the form of a solution of a multivalent metal salt, such as a solution of a metal chloride. Preferred multivalent cations include calcium, iron, aluminium, manganese, copper, zinc or lanthanum. A particularly preferred salt is calcium chloride.

Where the flavourant is a low potency aroma compound such as menthol, the flavour delivery material may comprise greater than about 30% by weight, or preferably greater than about 45% by weight of any one or more of the flavourants described herein. Alternatively or in addition, the flavour delivery material may comprise less than about 70% by weight, or preferably less than about 80% by weight of any one or more of the flavourants described herein. More preferably, the flavour delivery material comprises between about 30% by weight and about 80% by weight of flavourant, or most preferably between about 45% by weight and about 70% by weight of flavourant.

The flavour delivery material also preferably comprises at least about 15% by weight, and preferably at least about 25% by weight of any one or more of the triglycerides described herein. Alternatively or in addition, the flavour delivery material comprises less than about 60% by weight and preferably less than about 50% by weight of any one or more of the triglycerides described herein. More preferably, the flavour delivery material comprises between about 15% and about 60% by weight, and most preferably between about 25% and about 50% by weight of any one or more of the triglycerides described herein.

Further, the flavour delivery material comprises at least about 8% by weight, and preferably at least about 10% by weight, of any one or more of the polymer matrix materials described herein. Alternatively or in addition, the flavour delivery material comprises less than about 25% by weight, and preferably less than about 20% by weight of any one or more of the polymer matrix materials described herein. More preferably, the flavour delivery material comprises between about 8% and about 25% by weight, and most preferably between about 10% and about 20% by weight of any one or more of the polymer matrix materials described herein. The flavour delivery material may also comprise a high potency flavourant such as those described above, for example in an amount between about 1 part per million and about 300 parts per million.

Where the flavourant is a high potency flavourant such as those described above, the flavour delivery material may comprise greater than 1 part per million. Alternatively or in addition, the flavour delivery material may comprise less than 300 parts per million flavourant. More preferably, the flavour delivery material comprises between about 1 part per million and about 300 parts per million flavourant. The remainder of the flavour delivery material, including everything other than the flavourant, may comprise at least about 20% by weight, and preferably at least about 60% by weight, of any one or more of the triglycerides described herein. Alternatively or in addition, the remainder of the flavour delivery material comprises less than about 90% by weight of any one or more of the triglycerides described herein. More preferably, the remainder of the flavour delivery material comprises between about 20% and about 90% by weight, and most preferably between about 60% and about 90% by weight, of any one or more of the triglycerides described herein.

Further, the remainder of the flavour delivery material, including everything other than the flavourant, comprises at least about 10% by weight of any one or more of the polymer matrix materials described herein. Alternatively or in addition, the remainder of the flavour delivery material comprises less than about 40% by weight, and preferably less than about 20% by weight, of any one or more of the polymer matrix materials described herein. More preferably, the remainder of the flavour delivery material comprises between about 10% and about 40% by weight, and most preferably between about 10% and about 20% by weight, of any one or more of the polymer matrix materials described herein.

In some embodiments, the flavour delivery material consists only of one or more flavourants, one or more fats, and one or more polymer materials.

The flavourant in the flavour composition is released from the flavour delivery material when the polymer matrix is broken so that the domains of the flavour composition are opened up to the surrounding atmosphere. In some embodiments, the flavourants of the flavour delivery materials of the present invention begin to be released when the flavour delivery material is heated to temperatures above 220° C. This may be due to the decomposition or degradation of the polymer matrix. Alternatively or in addition, the matrix may be broken apart as a result of the expansion of the flavour composition within the domains upon heating, which may cause the polymer matrix to burst apart. Both of these factors may contribute to the release of the flavourant at temperatures above 220° C.

Preferably, an audible sound is produced as the polymer matrix breaks down and releases the flavourant upon heating to temperatures above 220° C. This provides the consumer with an audible indication that the flavourant is being released.

The temperature at which the flavourant starts to be released, and the size of the temperature range for the release of the flavourant, may depend upon a number of factors including, for example, the degree of cross-linking in the polymer matrix. In general, an increased degree of cross-linking in the polymer matrix will result in improved heat stability and the cross-linking can be controlled to a certain extent in order to control the release temperature of the flavourant. The release temperature may also depend upon the vaporisation temperature of the flavourant.

As described above, in some embodiments the flavourant is released from the flavour delivery material upon heating the material to temperatures above 220° C. It may also be possible to release the flavourant through the mechanical breakdown of the polymer matrix, which can be achieved at lower temperatures, for example below 220° C. For example, it may be possible to physically break down the polymer matrix through the application of shear force to the flavour delivery material.

The thermal release profile of the flavourant from flavour delivery materials according to the invention can be determined using a thermogravimetric analysis (TGA) in which a sample of the flavour delivery material is heated and the reduction in the mass of the sample is measured as the temperature increases. A suitable TGA test is described in more detail in the example below. In some embodiments, the flavour delivery material of the present invention has a total loss of mass of no more than about 15% upon heating the material up to 150° C. in a thermogravimetric analysis. In other embodiments, the flavour delivery material of the present invention has a total loss of mass of no more than about 15% upon heating the material up to 200° C., preferably up to 220° C., more preferably up to 250° C., or most preferably up to 300° C. in a thermogravimetric analysis. Even more preferably, the flavour delivery material has a total loss of mass of no more than about 12% upon heating the material up to 150° C., 200° C., 220° C., 250° C., or 300° C. in a thermogravimetric analysis.

The flavour delivery material of the present invention displays a significantly lower loss of total mass at temperatures below 220° C. than is seen in materials of a similar structure in which an excipient without long chain triglycerides is used. The small loss of mass at lower temperatures is predominantly due to loss of moisture from the flavour delivery material and only a small proportion of the flavourant appears to be lost. This indicates that the majority of the flavourant is retained within the polymer matrix until the flavour delivery material is heated to elevated temperatures. The relatively low loss of mass at lower temperatures demonstrates the stability of the flavour delivery material.

Preferably, the flavour delivery material of the present invention has a total loss of mass of at least about 30%, more preferably at least about 45%, and most preferably at least about 60% upon increasing the temperature of the flavour delivery material from 220° C. to 320° C. This loss of mass is a result of the loss of the flavourant from the flavour delivery material as the polymer matrix breaks down. The results of the thermogravimetric analysis therefore demonstrate that a large proportion of the flavourant is released at elevated temperatures.

The flavour delivery material of the present invention finds particular application as a flavour additive for smoking articles. The thermal release profile of the flavour release materials enables them to efficiently retain volatile flavourants within the polymer matrix until smoking.

According to the invention there is provided a smoking article including an aerosol-generating substrate comprising a flavour delivery material, as described above. The flavourant is releasable from the flavour delivery material upon combustion or heating of the aerosol-generating substrate during smoking of the smoking article. The aerosol-generating substrate may be a tobacco rod and the smoking article may further comprise a filter in axial alignment with the tobacco rod.

As described above, the flavour delivery material of the present invention provides an improved way in which to incorporate flavourants into a smoking article. The types of flavourants that are used in smoking articles are typically relatively volatile and it is difficult to retain acceptable levels of the flavourants within the smoking articles during storage. The volatile flavourants may also migrate to other parts of the smoking articles and can adversely impact the performance of other components of the smoking article, such as any sorbents provided within the filter.

The use of the flavour delivery material of the present invention to provide a flavourant within a smoking article advantageously reduces the loss of the flavourant during storage so that a larger proportion of the flavourant is retained within the smoking article. The flavour delivery material can therefore provide a more intense flavour to the mainstream smoke. Since the loss of the flavourant is reduced, it is possible to incorporate a smaller amount of the flavourant into each smoking article whilst providing the same effect on the flavour as provided in the prior art smoking articles.

The flavour delivery material of the present invention also effectively retains the flavourant within the material so that it does not come into contact with other components of the smoking article. The flavour delivery material of the present invention is therefore particularly desirable for use in smoking articles incorporating an adsorbent in the filter, such as activated carbon.

The use of the flavour delivery material of the present invention as a flavour additive in smoking articles also provides improved control over the delivery of the flavourant during smoking. The temperature at which the flavourant is released from the flavour delivery material can be controlled so that the flavourant is released at specific times or locations during heating or combustion of the aerosol-generating substrate. For example, in embodiments in which the aerosol-generating substrate comprises a tobacco rod, the flavourant is released at elevated temperatures and will therefore only be released as the pyrolysis zone in which the tobacco rod is combusting approaches the flavour delivery material. This also enables greater control over the delivery of the flavourant during smoking compared to flavourants that are released at lower temperatures.

Any of the flavour delivery materials described above may advantageously be provided in a variety of different forms so that there is flexibility in the way in which the material can be incorporated into the smoking article. The flavour delivery material may be provided in the form of beads. The beads may be formed into any suitable shape, but are preferably substantially cylindrical or spherical. The average diameter of the beads may be greater than about 0.2 mm, preferably greater than about 0.8 mm, and more preferably greater than about 1.2 mm. Alternatively or in addition, the average diameter of the beads may be less than about 3.5 mm, preferably less than about 2.5, and more preferably less than about 1.8 mm. Most preferably, the average diameter of the beads is between about 0.2 mm and about 3.5 mm, more preferably between about 0.8 mm and about 2.5 mm, even more preferably between about 1.2 mm and about 1.8 mm.

A single bead may be provided within the aerosol-generating substrate, or a plurality of beads may be provided, for example two or more, three or more, or four or more beads. Where a plurality of beads is provided, the beads may be spaced apart along the aerosol-generating substrate, or may be placed in one or more specific regions of the aerosol-generating substrate. One or more beads of the flavour delivery material can be inserted into the aerosol-generating substrate of smoking articles according to the invention using known apparatus and methods for inserting objects into filters or tobacco rods.

Alternatively, the flavour delivery material may be in the form of strips or flakes, which can be distributed through the material forming the aerosol-generating substrate along the entire length of the aerosol-generating substrate or deposited at one or more desired locations along the aerosol-generating substrate.

Alternatively again, the flavour delivery material may be in the form of an elongate filament or yarn, which can be introduced into the aerosol-generating substrate. A continuous filament may be provided along the full length of the aerosol-generating substrate during manufacture, or individual pieces of the filament may be deposited at one or more desired locations along the aerosol-generating substrate.

Suitable flavourants for incorporation into the smoking article would be well known to the skilled person and a number of suitable examples are listed above. In preferred embodiments of the invention, the flavourant in the flavour delivery material provided within the smoking article comprises a mint or menthol flavourant, a Eugenol flavourant, or a combination of menthol and Eugenol. These flavour types are commonly used to provide a refreshing flavour to the mainstream smoke.

The flavour delivery material may be coloured, if desired, through the inclusion of a colourant. Preferably, a colourant is incorporated into the flavour delivery material in order to adjust the colour of the material so that it resembles the colour of the material in the aerosol-generating substrate. For example, the flavour delivery material may be brown or green in colour. The flavour delivery material therefore has a low visibility in the aerosol-generating substrate. Alternatively or in addition to a colourant, the flavour delivery material may comprise tobacco powder in order to achieve a brown or green colouration of the material.

The flavourant is released from the flavour delivery material when the material is burnt or heated during smoking. The position of the flavour delivery material within the aerosol-generating substrate can therefore be adjusted in order to control the timing of the flavourant release during smoking. In particular, the flavour delivery material can be placed at one or more specific locations along the length of the aerosol-generating substrate in order to control the puff-by-puff delivery of the flavourant. In embodiments comprising a tobacco rod, the length of the tobacco rod that is combusted during each puff is typically between about 5 mm and about 10 mm.

Any of the flavour delivery materials referred to above may be provided in a flavour zone within the smoking article. In certain embodiments, the flavour zone may be at the downstream end of a tobacco rod, proximate a filter. The flavourant is therefore released into the mainstream smoke during the last puffs on the smoking article. A shift in the flavour can therefore be provided during the final puff or puffs on the smoking article. In such embodiments, the flavour zone is preferably located no more than 20 mm from the downstream end of the tobacco rod, more preferably no more than 15 mm from the downstream end of the tobacco rod and most preferably no more than 10 mm from the downstream end of the tobacco rod.

In other embodiments, a tobacco rod may be divided into a downstream third of the tobacco rod, an upstream third of the tobacco rod, and a middle third of the tobacco rod. The flavour zone may be located in at least one of the downstream third, the upstream third or the middle third of the tobacco rod. Where the flavour zone is in the downstream third or the middle third of the tobacco rod, or both, the flavour may be delivered at or near the last puffs of the cigarette. Where the flavour zone is in the upstream third of the tobacco rod, the flavour may be delivered earlier in the smoking experience.

The terms "upstream" and "downstream" are used to describe the relative position of components of the smoking articles according to the invention with reference to the direction of the flow of the mainstream smoke through the smoking article during smoking. For example, in a smoking article comprising a tobacco rod and a filter, the downstream end of the tobacco rod is therefore the end closest to the filter.

A single portion of the flavour delivery material may be provided at a specific position within a tobacco rod in order to achieve a single, discrete burst of flavour during one or two puffs. Alternatively, two or more separate portions of a flavour delivery material may be incorporated at different positions in the tobacco rod to provide several discrete bursts of flavour or a sustained delivery of one or more flavourants for a portion of the tobacco rod. The flavour delivery material in the separate portions may provide the same flavourant as each other, or different flavourants. The flavour delivery materials of the invention can therefore be used to provide novel combinations of tastes and flavours as well as novel flavour release profiles.

In alternative embodiments, the flavour delivery material may be dispersed uniformly amongst the material in the aerosol-generating substrate, along all or a part of the length of the aerosol-generating substrate. This arrangement of the flavour delivery material can provide a more continuous delivery of the flavourant during smoking.

In certain preferred embodiments of the present invention, the aerosol-generating substrate is formed of two or more connected aerosol-generating substrate portions in axial alignment with each other, wherein one or more of the substrate portions include the flavour delivery material and one or more of the substrate portions include only tobacco material. The substrate portions are preferably wrapped individually before being overwrapped together with the cigarette paper, so that a double layer of cigarette paper is provided. This arrangement may facilitate the inclusion of a specific amount of the flavour delivery material into specific portions of the aerosol-generating substrate.

The aerosol-generating substrate of smoking articles according to the invention may be formed of any suitable tobacco materials including but not limited to tobacco lamina, expanded tobacco, processed tobacco stems, reconstituted tobacco materials, tobacco substitutes or combinations of any of these materials. The tobacco material may include any types of tobacco leaf, including but not limited to Burley tobacco, flue-cured tobacco, Oriental tobacco, or blends of these tobaccos. The tobacco material forming the aerosol-generating substrate preferably comprises tobacco cut filler.

The aerosol-generating substrate may include greater than about 1 mg and preferably greater than about 3 mg of any of the flavour delivery materials described herein. In addition, or in the alternative, the aerosol-generating substrate may include less than about 20 mg, preferably less than about 12 mg, and more preferably less than about 8 mg of any of the flavour delivery materials described herein. Preferably, the aerosol-generating substrate includes between about 1 mg and about 20 mg, more preferably between about 1 mg and about 12 mg, and most preferably between about 3 and about 8 mg of the flavour delivery material.

In embodiments comprising a filter, the filter may be a single segment filter or a multi-component filter comprising two or more connected filter segments. A variety of suitable filter segments would be well known to the skilled person including but not limited to fibrous filter tows, cavity filter segments, tubular filter segments and flow restrictor segments. One or more of the filter segments may comprise an additional flavour material, a sorbent material, or a combination of a flavour material and a sorbent material.

Preferably, the overall length of smoking articles according to the present invention is between about 70 mm and about 128 mm, more preferably about 84 mm.

Preferably, the external diameter of smoking articles according to the present invention is between about 5 mm and about 8.5 mm, more preferably between about 5 mm and about 7.1 mm or between about 7.1 mm and about 8.5 mm.

Preferably, the overall length of the filters of smoking articles according to the present invention is between about 18 mm and about 36 mm, more preferably about 27 mm.

Smoking articles according to the present invention may be packaged in containers, for example in soft packs or hinge-lid packs, with an inner liner coated with one or more flavourants.

As well as combustible smoking articles, such as filter cigarettes, smoking articles in accordance with the present invention may be heated smoking articles in which material is heated to form an aerosol, rather than combusted. For example, the flavour material may be incorporated into a heated smoking article comprising a combustible heat source, such as that disclosed in WO-A-2009/022232, which comprises a combustible heat source and an aerosol-generating substrate downstream of the combustible heat source. The flavour release material may also be incorporated into heated smoking articles comprising non-combustible heat sources, for example, chemical heat sources or electrical heat sources such as electrical resistive heating elements.

According to the present invention there is also provided a method for producing a smoking article according to the invention, as described above. The method comprises the steps of: providing a flavour delivery material comprising a polymer matrix and a plurality of domains including a flavour composition within the polymer matrix, the flavour composition comprising a flavourant mixed with one or more triglycerides including at least 30% by weight of triglyceride having at least one carboxylic acid having a chain length of greater than 12; and forming an aerosol-generating substrate including the flavour delivery material. In some embodiments, the aerosol-generating substrate is a tobacco rod and the method further comprises a step of providing a filter in axial alignment with the tobacco rod to form the smoking article.

The flavour delivery material may be formed according to the following steps: dispersing the flavourant in the one or more triglycerides to form a flavour composition; mixing the flavour composition with a matrix polymer solution to form an emulsion; and adding the emulsion to a cross-linking solution to cross-link the matrix polymer solution to form the flavour delivery material. Preferably, the flavourant is mixed with the triglyceride excipient at a temperature of between 40° C. and 50° C. Preferably, the flavour composition is mixed with the matrix polymer solution at room temperature (22° C.) and preferably, the mixing is carried out under high shear, for example in a shear mixer at a shear rate of 100 s$^{-1}$. The mixture is not heated during this step although the temperature of the mixture may rise as a result of the applied shear.

Preferably, the matrix polymer solution comprises a solution of one or more polysaccharides in water. Preferably, the matrix polymer solution contains about 5% or less by weight of the polysaccharides. Preferably, the flavour composition and the matrix polymer solution are mixed to form a solution comprising between about 10% and about 40% by weight of the flavour composition, more preferably between about 15% and about 35% by weight of the flavour composition.

Preferably the emulsion is contacted with a cross-linking solution at a temperature of about 5° C. to about 15° C. Preferably, the cross-linking solution is a solution of approximately 5% by weight multivalent cations in water. Particularly preferably, the cross-linking solution is a calcium salt solution, for example, a calcium chloride solution. The emulsion is preferably left in contact with the cross-linking solution for between about 10 seconds and about 120 seconds, more preferably between about 40 seconds and about 80 seconds. The length of time may be selected depending on the desired degree of cross-linking and the desired hardness of the polymer matrix.

After cross-linking, the resultant flavour delivery material is removed from the cross-linking solution, for example, using a sieve or similar apparatus. The flavour delivery material is then preferably rinsed to remove the cross-linking solution from the surface and dried. Drying may be carried out using any suitable means, including for example a stream of hot air. The drying may optionally be carried out under vacuum.

Prior to being added to the cross-linking solution, the emulsion of the flavour composition and matrix polymer solution may be formed into a variety of shapes, depending upon the desired form of the flavour delivery material. For example, the emulsion may be formed into cylindrical or spherical shapes in order to produce threads, beads or droplets of the material. This may be carried out using a suitable extrusion or spheronisation technique. Alternatively, the emulsion may be formed into a sheet, cut into strips or flakes, or drawn into an elongate filament or yarn.

According to the invention there is further provided the use of a flavour delivery material in a smoking article, the flavour delivery material comprising a polymer matrix and a plurality of domains including a flavour composition within the polymer matrix. The flavour composition comprises a flavourant mixed with one or more triglycerides including at least 30% by weight of triglyceride having at least one carboxylic acid having a chain length of greater than 12. The flavourant is releasable from the flavour delivery material upon heating of the smoking article.

The invention will be further described, by way of example only, with reference to the accompanying drawings, in which.

Figure 1:
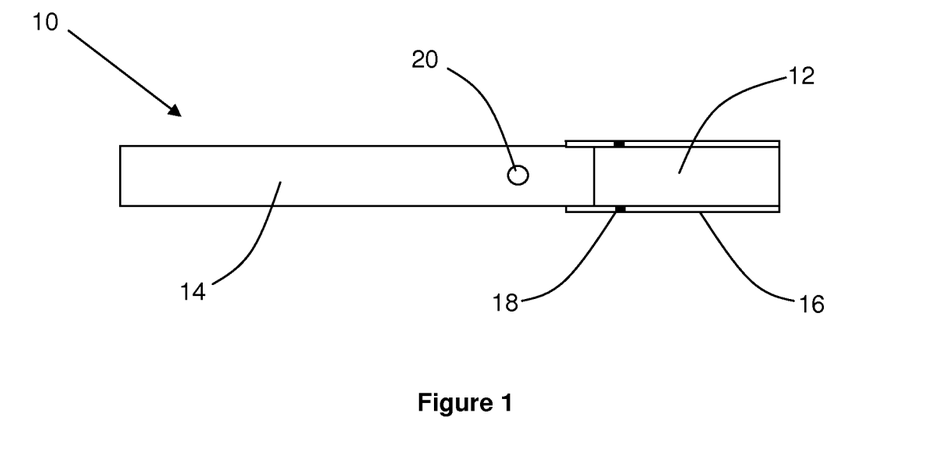
FIG. 1 shows a side view of a filter cigarette according to the present invention comprising a flavour delivery material in the tobacco rod.

The cigarette 10 shown in FIG. 1 comprises an elongate, cylindrical wrapped tobacco rod 12 attached at one end to an axially aligned, elongate, cylindrical filter 14. The filter 14 includes a single segment of cellulose acetate tow. The wrapped tobacco rod 12 and the filter 14 are joined in a conventional manner by tipping paper 16, which circumscribes the entire length of the filter 14 and an adjacent portion of the wrapped tobacco rod 12. To mix ambient air with mainstream smoke produced during combustion of the wrapped tobacco rod 12, a plurality of annular perforations 18 are provided through the tipping paper 16 at a location along the filter 14.

A single flavour bead 20 formed of a flavour delivery material according to the invention is provided within the tobacco rod 12, approximately 10 mm from the downstream end of the tobacco rod 12, where the tobacco rod 12 is adjoined to the filter 14. The flavour delivery material in the bead 20 incorporates a menthol flavourant which is released upon heating the material to a temperature above 220° C. The menthol flavourant is therefore released into the mainstream smoke as the portion of the tobacco rod containing the flavour bead 20 is burnt during smoking. As a result of the positioning of the flavour bead 20 at the downstream end of the tobacco rod 12, the flavourant is released during one of the last puffs on the cigarette 10. The consumer will therefore experience a burst of menthol flavour towards the end of the smoking of the cigarette.

An example of a suitable formulation for the flavour delivery material forming the bead and a process for forming the flavour delivery material is set out below.

EXAMPLE

The flavour delivery material comprises a cross-linked pectin-alginate matrix with a plurality of domains of a menthol flavour composition dispersed through the matrix. To produce the flavour delivery material the menthol flavour composition is first formed from a mixture of the following components:

| Component | Amount (weight %) |
|---|---|
| Natural menthol | 65.69 |
| Astra "A" Press Cocoa Butter (available from ADM Cocoa) | 32.84 |
| Peppermint Oil | 1.47 |

A matrix polymer solution is then formed from a mixture of the following components:

| Component | Amount (weight %) |
|---|---|
| Sodium alginate (available from Sigma Aldrich) | 2.74 |
| Pectin (available from Sigma Aldrich) | 0.96 |
| Water | 96.30 |

A solution is formed with 20% w/w of the flavour composition and 80% w/w of the matrix polymer solution. The solution is mixed in a shear mixer, such as a Polytron 3100B equipped with a dispersing aggregate head PT-DA 3030/4 EC with a diameter of 30 mm, available from Kinematica. The solution is subjected to high shear at an RPM of 15000 to 20000 whilst maintaining the mixture at a temperature of 52-55° C. The mixing is continued for 3 to 4 minutes to produce an emulsion of the flavour composition in the matrix polymer solution in which the size of the flavour composition droplets is reduced to below 5 microns.

The resultant emulsion is formed into the shape of spherical beads having a diameter of approximately 1.5 mm and dropped into a cross-linking solution of the following composition, at a temperature of 4° C.:

| Component | Amount (weight %) |
|---|---|
| Calcium chloride (available from Sigma Aldrich) | 5.0 |
| Water | 95.0 |

The beads are left in the cross-linking solution for approximately 60 seconds in order to cross-link the alginate and pectin to form the polymer matrix. The beads are then removed from the cross-linking solution and washed in water before being dried in hot dried air at a temperature of 40-50° C. for 300 minutes.

Figure 2:
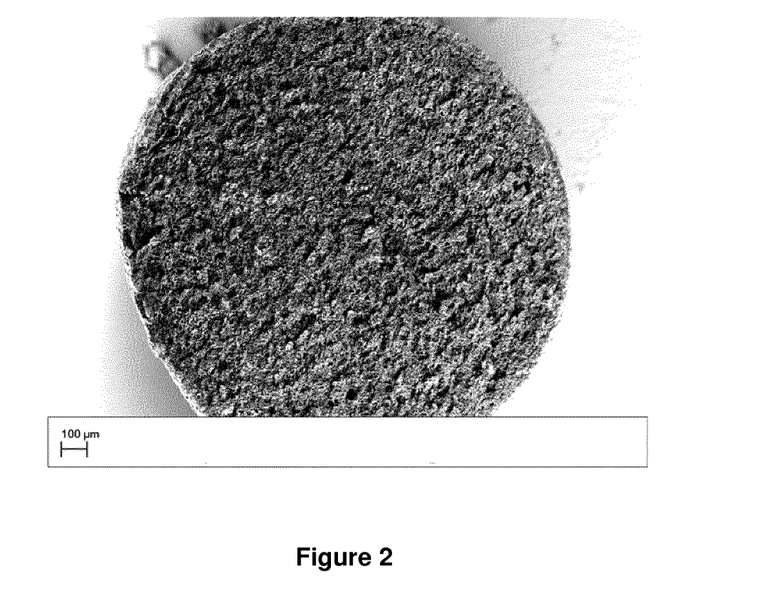
FIG. 2 shows a scanning electron microscope image of the flavour delivery material used in the filter cigarette of FIG. 1.

FIG. 2 shows a scanning electron microscope image of the flavour delivery material produced in the above example. It can be seen from the image that the internal structure of the flavour delivery material is provided by a polymer matrix with a plurality of small domains of the flavour composition dispersed through the matrix. The domains are relatively uniformly distributed through the material and are relatively consistent in size, providing improved stability as described above.

Figure 3:
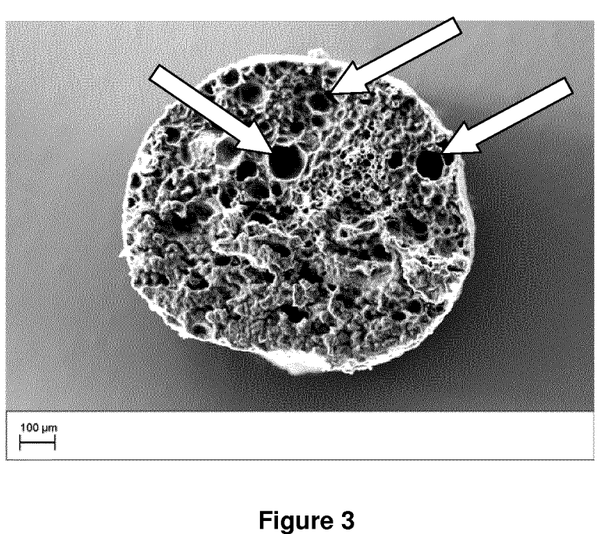
FIG. 3 shows a comparative scanning electron microscope image of an alternative flavour delivery material.

FIG. 3 shows a comparative scanning electron microscope image of a flavour delivery material comprising a similar type of structure formed in a similar process but in which the flavour composition is formed using an excipient which does not include at least 30% by weight long chain triglycerides. This flavour material is therefore not according to the invention.

It can be seen that the internal structure of the flavour delivery material in FIG. 3 is different to that of the flavour delivery material of the present invention. In particular, in the flavour delivery material shown in FIG. 3, the size of many of the domains is larger than the size of the corresponding domains in the material shown in FIG. 2. The arrows in FIG. 3 highlight some of the large domains in the sample. In addition, in the material shown in FIG. 3, the domains are more open and have a less consistent size distribution than in the material of FIG. 2. As a result of the larger and more open domain structure in the material shown in FIG. 3, the menthol moves more readily to the outer surfaces of the material and there is a greater loss of menthol from the material during storage than from the material according to the invention.

The flavour release profile of the flavour delivery material produced according to the example above may be analysed in a thermogravimetric analysis (TGA). The TGA test is carried out using a STA 409 CD thermogravimetric machine from Netzsch coupled to a mass spectrometer, or similar TGA equipment. In the analysis the flavour delivery material is heated from 25° C. to 600° C. in an inert nitrogen atmosphere with the temperature being increased at a rate of 15° C. per minute and with an air flow of 60 ml per minute. As the temperature is increased, the mass of the material is measured so that the percentage reduction in mass as a function of temperature could be determined.

When heated in the thermogravimetric analysis described, the flavour delivery material produced according to the example above showed a total loss of mass of approximately 11.5% upon heating the flavour delivery material to 220° C. In contrast, the flavour material shown in FIG. 3, produced with an alternative excipient, showed a total loss of mass of approximately 20% when heated in the same way in a thermogravimetric analysis. These results clearly demonstrate the positive effect of the inclusion of the long chain triglycerides in the flavour composition on the stability of the flavour delivery material.

The viscosity of the triglyceride excipient (for example, the cocoa butter) can be measured by placing a sample of the cocoa butter into the double walled MV-DIN container of the M5 measuring head of the HAAKE RV20 rheometer equipped with a MV-DIN measuring spindle head for medium viscosity liquids, or similar viscosity measurement equipment. The temperature of the cocoa butter is increased to 60° C. at a constant shear rate of 200 $s^{-1}$. During this stage, the temperature is measured using a PT100 temperature probe located in the bath between the walls of the double walled cylinder. The viscosity of the cocoa butter is then measured as the cocoa butter is cooled whilst maintaining the constant shear rate of 200 $s^{-1}$. The temperature at which complete solidification of the sample occurs is also measured, which corresponds to the point at which the spindle stops turning. During cooling, the temperature of the inner mantle is measured.

The viscosity of the cocoa butter used in the example described above was tested using this procedure and during cooling from 60° C. to 30° C. the viscosity of the cocoa butter was found to increase as set out in the table below:

| Temperature (° C.) | Viscosity (mPa · sec) |
|---|---|
| 60 | 21 |
| 55 | 25 |
| 50 | 30 |
| 45 | 36 |

-continued

| Temperature (° C.) | Viscosity (mPa · sec) |
|---|---|
| 40 | 43 |
| 35 | 52 |
| 31 | 60 |

The cocoa butter began to crystallise at around 30° C. producing a sharp increase in the viscosity, to 503 mPa·s. The viscosity continued to increase as the temperature decreased below 30° C., with complete solidification of the cocoa butter occurring at 18.8° C.

The melting point of the triglyceride excipient (for example, the cocoa butter) can be measured in the following test in which the slip point (the temperature at which the cocoa butter starts to melt) and the clear point (the temperature at which the cocoa butter is fully liquid and molten) are measured.

A sample of >50 grams of cocoa butter is first heated to a temperature of 50-60° C. and filtered through a fluted filter (Whatman no. 3, diameter 15 cm). 50 grams of the filtered cocoa butter is cooled to 25° C. in a first water bath and subsequently heated to 32-33° C. in a second water bath whilst stirring constantly. The cocoa butter is then poured into a metal tray and allowed to stand for 2 hours at room temperature (20-22° C.).

The melting point of the pre-treated cocoa butter is then determined according to H. Fincke, as follows. A 1 cm column of the pre-treated cocoa butter from the metal tray is pressed into the longer side of a U-tube for melting point determination. The shorter side of the U-tube is fixed to a thermometer, with the bulb of the thermometer at the same level as the bend of the U-tube. The U-tube and thermometer are introduced into an inner water bath of melting point equipment. The melting point equipment includes an inner water bath and an exterior water bath in which the water level of the outer water bath is 9.5 cm and the water level of the inner water bath is 1 cm below the water level of the exterior water bath.

The exterior water bath is slowly heated whilst constantly stirring. Up to 30° C. the maximum temperature increase in the inner bath may be 1° C. per minute. About 30° C. the temperature of the inner bath is increased by no more than 0.2° C. per minute. The temperature at which the column of cocoa butter in the U-tube moves down is measured and this corresponds to the slip point. The temperature at which the cocoa butter column is completely clear is also measured and this corresponds to the clear point.

It will be appreciated that corresponding analysis techniques can be applied to other favour delivery materials according to the invention.

The invention claimed is:

1. A smoking article comprising an aerosol-generating substrate, wherein the aerosol-generating substrate comprises a flavour delivery material for thermally releasing a flavourant, the flavour delivery material comprising:
   a polymer matrix; and
   a plurality of domains including a flavour composition within the polymer matrix, the flavour composition comprising a flavourant mixed with a triglyceride excipient comprising at least one fat including at least 30% by weight of triglycerides having at least one carboxylic acid having a chain length of greater than 12, wherein the flavourant has a melting point that is within 15° C. of the melting point of the at least one fat;
   wherein the domains within the polymer matrix have an average domain size of 20 microns or less;
   wherein the polymer matrix comprises at least about 20% by weight pectin and at least about 60% by weight alginate; and
   wherein the flavourant is releasable from the flavour delivery material upon heating of the smoking article.

2. A smoking article according to claim 1 wherein the flavourant has a melting point that is within 10° C. of the melting point of the at least one fat.

3. A smoking article according to claim 1 wherein the at least one fat has a clear point melting point of at least 27° C.

4. A smoking article according to claim 1 wherein the flavour composition comprises between 50% and 75% by weight of the flavourant and between 25% and 50% by weight of the triglyceride.

5. A smoking article according to claim 1 wherein the viscosity profile of the triglyceride excipient is such that solidification of the triglyceride excipient begins at 35° C. or lower upon cooling of the triglyceride excipient from 70° C.

6. A smoking article according to claim 5 wherein the triglyceride excipient is completely solid at 25° C. or lower.

7. A smoking article according to claim 1 wherein the flavourant is releasable from the polymer matrix upon heating the flavour delivery material above 220° C.

8. A smoking article according to claim 1 wherein the flavour delivery material has a total loss of mass of no more than 15% upon increasing the temperature of the flavour delivery material to 220° C.

9. A smoking article according claim 1 wherein the flavourant comprises menthol.

10. A smoking article according to claim 1 wherein the triglyceride excipient comprises a polymorphic fat.

11. A smoking article according to claim 1 wherein the triglyceride excipient comprises cocoa butter.

12. A smoking article according to claim 11 wherein the flavour composition comprises 50 to 75% by weight menthol dispersed in cocoa butter.

13. A smoking article according to claim 1 wherein the flavour delivery material has total loss of mass of at least 50% when increasing the temperature of the flavour delivery material from 220° C. to 320° C.

14. A smoking article according to claim 1, wherein 80% of the domains of the flavour composition have a diameter of 20 microns or less.

15. A method for producing a smoking article, the method comprising the steps of:
   providing a flavour delivery material comprising a polymer matrix and a plurality of domains including a flavour composition within the polymer matrix, the flavour composition comprising a flavourant mixed with a triglyceride excipient comprising at least one fat including at least 30% by weight of triglyceride having at least one carboxylic acid having a chain length of greater than 12, wherein the flavourant has a melting point that is within 15° C. of the melting point of the at least one fat; wherein the domains within the polymer matrix have an average domain size of 20 microns or less;
   wherein the polymer matrix comprises at least about 20% by weight pectin and at least about 60% by weight alginate; and
   forming an aerosol-generating substrate including the flavour delivery material.

16. Use of a flavour delivery material in a smoking article, the flavour delivery material comprising:
- a polymer matrix; and
- a plurality of domains including a flavour composition within the polymer matrix, the flavour composition comprising a flavourant mixed with a triglyceride excipient comprising at least one fat including at least 30% by weight of triglyceride having at least one carboxylic acid having a chain length of greater than 12, wherein the flavourant has a melting point that is within 15° C. of the melting point of the at least one fat; wherein the domains within the polymer matrix have an average domain size of 20 microns or less;
- wherein the polymer matrix comprises at least about 20% by weight pectin and at least about 60% by weight alginate; and
- wherein the flavourant is releasable from the flavour delivery material upon heating of the smoking article.

17. The use according to claim 16, wherein at least about 80% of the domains have a size smaller than 20 microns.

* * * * *